July 15, 1941.   W. G. NOACK   2,249,489
COMBUSTION APPARATUS
Filed May 25, 1938   2 Sheets-Sheet 2
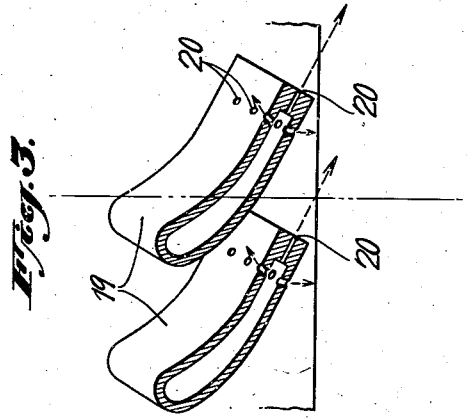
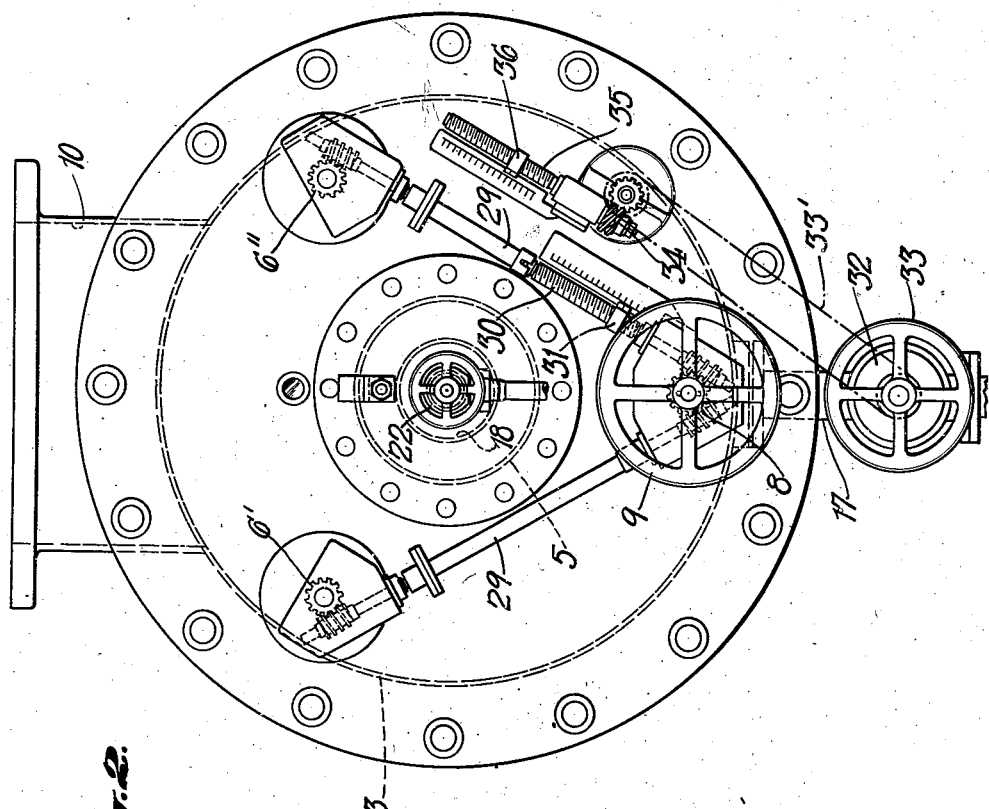
INVENTOR
WALTER GUSTAV NOACK.
BY
Karl A. Mayr.
ATTORNEY Patented July 15, 1941

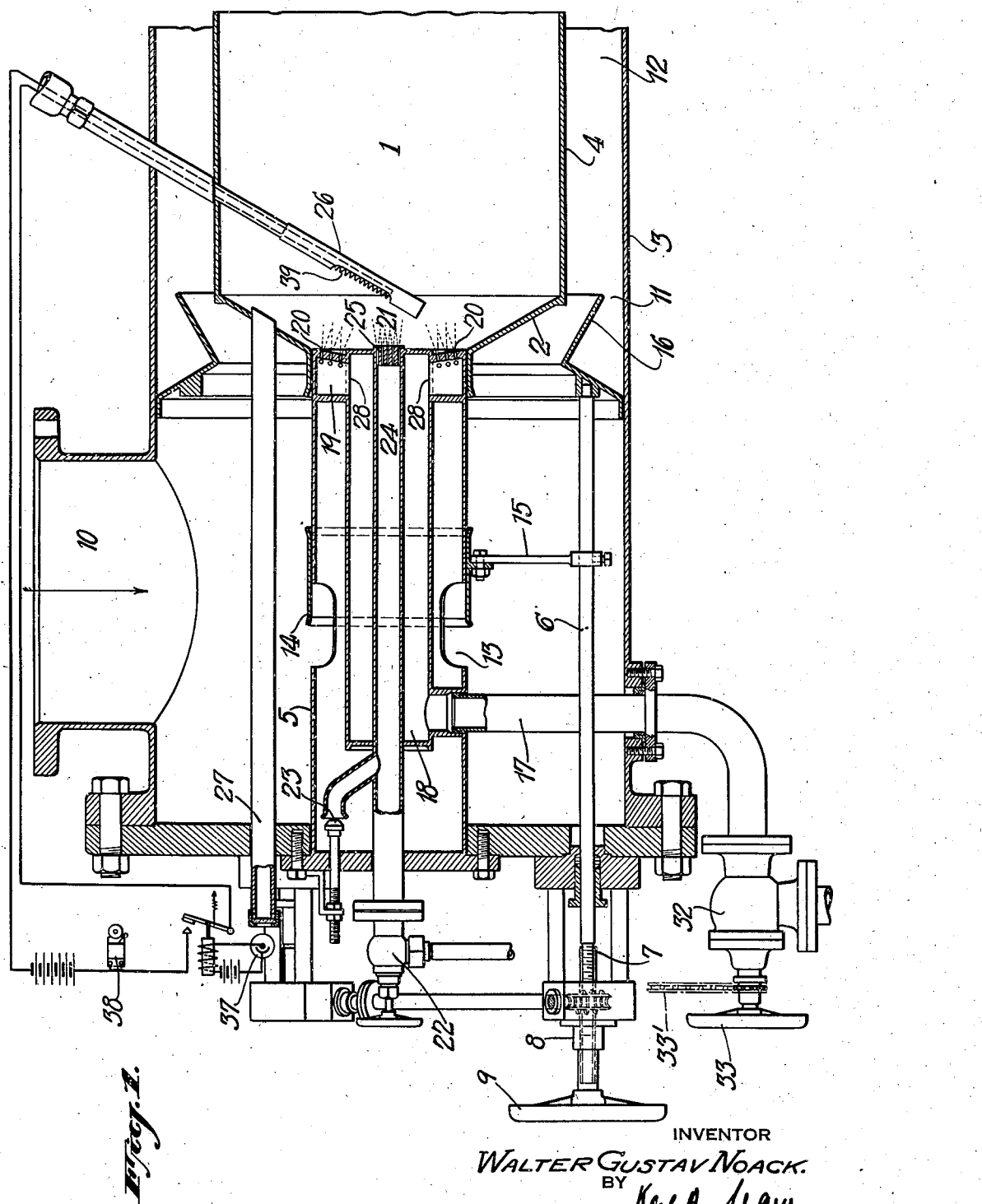

2,249,489

UNITED STATES PATENT OFFICE 2,249,489

COMBUSTION APPARATUS

Walter Gustav Noack, Baden, Switzerland, assignor to Aktiengesellschaft Brown, Boveri & Cie., Baden, Switzerland Application May 25, 1938, Serial No. 209,907

8 Claims. (Cl. 158—1)

This invention relates to an apparatus for producing hot gases of a predetermined temperature.

There are many instances, particularly in chemical engineering, where heated gases of a predetermined moderate temperature are required. Also in mechanical engineering, for example for the operation of power producers, such as gas turbines, gases are needed which have, aside from a certain pressure, a certain temperature which, in the case of turbines, is determined by the temperature allowable for the safe operation of the turbine blades. Usually the heating and operating gases are produced in a combustion chamber which is constructed of, or lined by means of brick work and the desired low temperature is obtained by using much excess air for the combustion process.

An object of the present invention is to provide an apparatus for the production of heat or operating gases of a predetermined, moderate temperature which apparatus is not subjected to much wear and which is efficient in operation.

Another object of the present invention is to provide a combustion apparatus which is completely constructed of metal and comprises two main parts, the combustion chamber proper in which any desired fuel is burnt with little excess air, and a shell surrounding said combustion chamber, whereby a space is provided between said shell and the outer wall of said chamber through which space cold gases, such as air are blown. The cooling gas has substantially the same pressure as the gas or the combustion air in the combustion chamber. The forces acting on the combustion chamber wall are therefore small and said wall is constructed with the main consideration of high heat resistance. The gases on the outside of the combustion chamber flow at great velocity whereby high heat transfer and efficient cooling of the combustion chamber wall is obtained. The cooling gases are mixed with the hot products of combustion whereby a gas mixture of a desired moderate temperature is obtained which can be used for heating or operating purposes.

The gases within the combustion chamber move at relatively low velocity. I may, however, construct the combustion chamber with a comparatively small cross section so that the chamber fits into the pipe line which is otherwise used for conducting the gases to be heated. In this case also the velocities within the combustion chamber are comparatively high and care must be taken to insure complete and efficient combustion and particularly that the flame within the chamber is not carried away by the great draft and the location of the point of ignition remains the same at all operating conditions so that the combustion process is stable and the flame is not extinguished by the draft.

It is a further object of the present invention to provide a combustion apparatus having a pilot burner and means for preheating the mixture to be burnt for obtaining the results set forth in the paragraph next above. Said pilot or auxiliary burner not only serves for starting up the combustion apparatus, but also functions during normal operation and insures efficient and reliable combustion.

Further and other objects of the present invention will be hereinafter set forth in the accompanying specification and shown in the drawings which, by way of illustration, show what I now consider to be a preferred embodiment of my invention.

The apparatus according to the present invention illustrated in the drawings is designed for gas as fuel with slight modifications, without departing from the scope of the present invention, it can also be used for oil or pulverized solid fuel.

In the drawings:

Figure 1 is a longitudinal cross-sectional view of an apparatus according to the present invention.

Figure 2 is a front view of the apparatus illustrated in Figure 1.

Figure 3 shows a detail of the apparatus according to Figs. 1 and 2 in large scale.

Like numerals indicate like parts in all figures of the drawings.

Referring more particularly to the drawings, I represents the combustion chamber having a wall 4 which is made of heat resisting metal and which forms a closure 2 at the burner end of the chamber. 3 is the exterior shell which forms also the conduit for conducting the gases to be heated to the device in which they are used. The air for combustion which may form part of a mixture of air and gas enters through conduit 10. Part of the air or gas-air mixture enters, through the annular space 11 formed by the annular valve member 16, the annular space 12 between the combustion chamber wall 4 and the conduit 3; another part enters the combustion chamber 1 through slots 13 in conduit 5 which terminates in chamber 1. The opening of slots 13 and thereby the area of the passage for the air or air-gas mixture can be changed by means of the adjustable sleeve 14. Sleeve 14 is connected by means side of the combustion apparatus and is provided with a thread 7 at its outer end; the threaded end extends into the nut member 8 which is connected with a hand wheel 9; upon rotation of wheel 9, rod 6 and with it sleeve 14 are moved axially and the port holes 13 opened or closed.

To rod 6 also the annular valve member 16 is connected which member is controlled simultaneously with sleeve 14 so that valve 16 is opened when slots 13 are closed and vice versa. Three rods of the type of rod 6 may be provided which are simultaneously operated when wheel 9 is revolved. The additional rods 6' and 6" are connected with and driven by wheel 9 by means of worm gear transmissions comprising connecting shafts 29 as can be seen in Fig. 2. One of the shafts 29 is provided with a threaded portion 30 which cooperates with a nut 31 which cannot rotate but which runs axially along shaft 29 upon rotation of said shaft. The position of nut 31 indicates the position of the combustion air admission gate 14 and also of valve 16.

A similar device is provided in connection with the hand wheel 33 of the fuel valve 32. By means of the worm gear 34 which is connected with hand wheel 33 by means of chain 33' the threaded shaft 35 is revolved along which the nut member 36 moves upon rotation of shaft 35. Member 36 cannot rotate but can move axially. The position of member 36 indicates the position of fuel valve 32. By observation of members 31 and 36 the amount of combustion air and of fuel supplied to the combustion apparatus can be learned.

The fuel is supplied through conduit 17 and is conducted through channel 18 into the hollow guide blades 19 through the openings 28. The fuel leaves blades 19 through the nozzle openings 20 and is mixed with the combustion air which is supplied through conduit 5.

One of the hollow blades 19 is shown in larger scale in Fig. 3. The blades are curved similar to the blades in turbines and serve for imparting a whirling motion to the combustion air. The interior of the blades is rather large whereby the velocity of the fuel is reduced and static pressure is built up in the fuel so that the fuel enters the combustion chamber through nozzle openings 20 at high velocity. Such openings are provided not only at the end edge of the blades but also on the lateral surfaces thereof whereby turbulent entrance of the fuel and thereby thorough mixture of the fuel with the combustion air is assured.

The velocity at which fuel and/or combustion air leave the whirling device which is made up of blades 19 can be held very high in order to produce a good mixing and whirling effect and to reduce the size of the apparatus. At such high velocities, however, the flame may not stay close to the burner mouth and may be carried away and extinguished. To prevent this I provide an auxiliary flame the combustion air-fuel mixture for which enters the burner at low velocity, so that a stable, reliable flame is produced. This auxiliary flame continuously preheats the main fuel-air mixture, and permanently aids in igniting the mixture. The auxiliary flame develops at the mouth 21 of the auxiliary burner tube 24. The fuel enters the auxiliary burner through control valve 22, and the combustion air is admitted into the auxiliary burner through valve 23. Combustible mixture exists therefore within the burner tube 24. In order to prevent ignition of the mixture within tube 24 the burner end of said tube is closed by a grid 25 consisting of a plurality of narrow-meshed wire screens or closely spaced grate plates.

For initial ignition of the igniting flame a torch 26 is inserted. An electrically heated wire 39 or silicon carbide rod may be used for this purpose.

It is of great importance that the fuel supplied to the apparatus according to the present invention is always ignited and is not carried further into conduit 3 unburnt where it may cause explosions or overheating. To facilitate supervision of combustion within the apparatus a peep hole 27 is provided.

I may further provide an electric eye 37 or similar means which actuates an alarm 38 whenever there is no flame, i. e. no combustion in chamber 1. The alarm 38 may be shunted to an electric circuit which heats the wire 39 of the torch 26.

While I believe the above described embodiments of my invention to be preferred embodiments, I wish it to be understood that I do not desire to be limited to the exact details of the design and construction shown and described, for obvious modifications will occur to a person skilled in the art.

I claim:

1. A high capacity combustion apparatus for the production of pressure gas having moderate temperature comprising, in combination, a pressure resisting air carrying conduit, a heat resisting combustion chamber situated substantially centrally within and shielding said conduit from radiant heat and being externally cooled by air flowing through said conduit, a fuel supply conduit connected with said combustion chamber and disposed within said air conduit and an annular valve member disposed within said air conduit and between said air conduit and said combustion chamber for controlling the amount of cooling air passing through said air conduit in the space between said conduit and said combustion chamber.

2. A high capacity combustion apparatus for the production of pressure gas having moderate temperature comprising, in combination, a pressure resisting air carrying conduit, a heat resisting combustion chamber situated substantially centrally within and shielding said conduit from radiant heat and being externally cooled by air flowing through said conduit, an annular valve member disposed within said conduit and between said conduit and said combustion chamber and surrounding said combustion chamber for controlling the amount of cooling air passing through said conduit between said conduit and said combustion chamber, a combustion air supply conduit connected with said combustion chamber and being disposed substantially centrally within said first mentioned conduit, a fuel supply conduit within said air supply conduit, and fuel and air mixing and whirling means rigidly connected to and rigidly interconnecting said air and fuel supply conduits and maintaining the relative position of said conduits.

3. A high capacity combustion apparatus for the production of pressure gas having moderate temperature comprising, in combination, a pressure resisting cooling air carrying conduit, a heat resisting combustion chamber situated substantially centrally within and shielding said conduit from radiant heat and being externally cooled by air flowing through the space extending around said combustion chamber and between said conduit and said combustion chamber, an annular valve member disposed within said conduit and between said conduit and said combustion chamber for controlling the amount of cooling air passing through the space between said conduit and said combustion chamber and extending around the latter, a combustion air supply conduit connected with said combustion chamber and being disposed substantially centrally within said cooling air conduit, a fuel supply means connected with said combustion chamber and disposed within said air supply conduit, and annular, axially movable and adjustable air inlet valve means disposed around said air supply conduit for controlling the flow of combustion air from said first mentioned conduit into said air supply conduit and directing air concentrically into said combustion air conduit.

4. A high capacity combustion apparatus for the production of pressure gas having moderate temperature comprising, in combination, a pressure resisting cooling air carrying conduit, a heat resisting combustion chamber situated substantially centrally within and shielding said conduit from radiant heat and being externally cooled by air flowing through the space extending around said combustion chamber and between said conduit and said combustion chamber, an annular valve member disposed within said conduit and between said conduit and said combustion chamber for controlling the amount of cooling air passing through the space between said conduit and said combustion chamber and extending around the latter, a combustion air supply conduit connected with said combustion chamber and being disposed substantially centrally within said cooling air conduit, a fuel supply means connected with said combustion chamber and disposed within said air supply conduit, annular, axially movable and adjustable air inlet valve means disposed around said air supply conduit for controlling the flow of combustion air from said first mentioned conduit into said air supply conduit and directing air concentrically into said combustion air conduit, and valve operating means connected with said valve member and said inlet valve means for simultaneous operation of said member and means.

5. A high capacity combustion apparatus for the production of pressure gas having moderate temperature comprising, in combination, a pressure resisting air carrying conduit, a heat resisting combustion chamber situated substantially centrally within and shielding said conduit from radiant heat and being externally cooled by air flowing through said conduit, a fuel supply conduit connected with said combustion chamber and disposed within said air conduit and terminating in said combustion chamber, a valve member disposed within said air conduit and between said air conduit and said combustion chamber and controlling the amount of cooling air passing through said air conduit in the space between said conduit and said combustion chamber, and an auxiliary fuel supply conduit disposed within said first mentioned fuel supply conduit and terminating in said combustion chamber substantially at the same point as said first mentioned fuel supply conduit.

6. A high capacity combustion apparatus for the production of pressure gas having moderate temperature comprising, in combination, a pressure resisting air carrying conduit, a heat resisting combustion chamber situated substantially centrally within and shielding said conduit from radiant heat and being externally cooled by air flowing through said conduit, a valve member disposed within said conduit and between said conduit and said combustion chamber and surrounding said combustion chamber for controlling the amount of cooling air passing through said conduit between said conduit and said combustion chamber, a combustion air supply conduit connected with said combustion chamber and disposed substantially centrally within said first mentioned conduit, a fuel supply conduit disposed within said combustion air supply conduit and terminating in said combustion chamber, an auxiliary fuel supply conduit disposed within said first mentioned fuel supply conduit and terminating in said combustion chamber substantially at the same point as said first mentioned fuel supply conduit and being connected for air flow with said combustion air supply conduit for receiving combustion air therefrom.

7. A high capacity combustion apparatus for the production of pressure gas having moderate temperature comprising, in combination, a pressure resisting air carrying conduit, a heat resisting combustion chamber situated substantially centrally within and shielding said conduit from radiant heat and being externally cooled by air flowing through said conduit, a valve member disposed within said conduit and between said conduit and said combustion chamber and surrounding said combustion chamber for controlling the amount of cooling air passing through said conduit between said conduit and said combustion chamber, a combustion air supply conduit connected with said combustion chamber and disposed within said first mentioned conduit and connected for air flow therewith, air flow control means connected with said combustion air supply conduit for controlling the amount of air flowing from said first mentioned conduit into said combustion air supply conduit, and a fuel supply conduit disposed within said combustion air supply conduit.

8. A high capacity combustion apparatus for the production of pressure gas having moderate temperature comprising, in combination, a pressure resisting air carrying conduit, a heat resisting combustion chamber situated substantially centrally within and shielding said conduit from radiant heat and being externally cooled by air flowing through said conduit, a valve member disposed within said conduit and between said conduit and said combustion chamber and surrounding said combustion chamber for controlling the amount of cooling air passing through said conduit between said conduit and said combustion chamber, a main combustion air supply conduit connected with said combustion chamber and being disposed within said first mentioned conduit and connected for air flow therewith, air flow control means connected with said combustion air supply conduit for controlling the amount of air flowing from said first mentioned conduit into said combustion air supply conduit, a main fuel supply conduit disposed within said combustion air supply conduit, an auxiliary fuel supply conduit disposed within said main fuel supply conduit and terminating in said combustion chamber adjacent to said main fuel supply conduit, adjustable combustion air supply means connected with said auxiliary conduit and receiving air from said main combustion air supply conduit, and fuel supply control means connected with said auxiliary fuel supply conduit for controlling the fuel supply thereto.

WALTER GUSTAV NOACK.